(12) United States Patent
Hennemann et al.

(10) Patent No.: US 8,516,678 B2
(45) Date of Patent: Aug. 27, 2013

(54) PUSH LOCK PIPE CONNECTION SYSTEM

(75) Inventors: Thomas L. Hennemann, Cottage Grove, MN (US); Garth H. Saul, Faribault, MN (US)

(73) Assignee: Bilfinger Water Technologies Inc., New Brighton, MN (US)

( * ) Notice: Subject to any disclaimer, the term of this patent is extended or adjusted under 35 U.S.C. 154(b) by 298 days.

(21) Appl. No.: 12/956,402

(22) Filed: Nov. 30, 2010

(65) Prior Publication Data
US 2011/0088239 A1    Apr. 21, 2011

Related U.S. Application Data

(62) Division of application No. 12/365,000, filed on Feb. 3, 2009, now Pat. No. 8,342,579.

(51) Int. Cl.
*B23P 11/02* (2006.01)
*F16L 39/00* (2006.01)

(52) U.S. Cl.
USPC .............................................. 29/453; 285/319

(58) Field of Classification Search
USPC .................. 29/428, 453, 451, 450, 446, 505, 29/506; 285/319, 340, 321
See application file for complete search history.

(56) References Cited

U.S. PATENT DOCUMENTS

| | | |
|---|---|---|
| 1,587,079 A | 6/1926 | Machino |
| 2,111,956 A | 3/1938 | Baldwin |
| 2,785,910 A | 3/1957 | Munger |
| 3,272,538 A | 9/1966 | Bergstrom |
| 3,389,923 A | 6/1968 | Love |
| 3,413,021 A | 11/1968 | Pott |
| 3,534,776 A | 10/1970 | Gilreath |
| 3,744,824 A | 7/1973 | Roos |

(Continued)

FOREIGN PATENT DOCUMENTS

| | | |
|---|---|---|
| CH | 688 659 A5 | 12/1997 |
| DE | 24 40 886 A1 | 3/1976 |

(Continued)

OTHER PUBLICATIONS

Mid-Continent, "PVC Water Well Casings and Screens" brochure, pp. MP00014-MP00017, published Apr. 1975, place of publication—unknown.

(Continued)

*Primary Examiner* — John C Hong
(74) *Attorney, Agent, or Firm* — Moore & Van Allen PLLC

(57) ABSTRACT

A pipe for connecting to a similar adjacent pipe. The pipe has a female end with a plurality of rigid fingers extending into the space within the female end. The plurality of rigid fingers extends from at least one interior circumferential groove on the interior surface of the female end. On the male end of the pipe there is at least one exterior circumferential groove that is sized and positioned to receive the plurality of rigid fingers from a corresponding interior circumferential groove on the female end of an adjacent pipe. The number of interior circumferential grooves on the female end with the plurality of rigid fingers extending from them typically corresponds to the number of exterior circumferential grooves on the male end. When the male end of a similar adjacent pipe is inserted into the female end of the pipe, the plurality of rigid fingers is received within the corresponding exterior circumferential groove on the male end, thereby preventing the male end of the similar adjacent pipe from being withdrawn from the female end of the pipe.

6 Claims, 7 Drawing Sheets

(56) References Cited

U.S. PATENT DOCUMENTS

| | | |
|---|---|---|
| 3,784,235 A | 1/1974 | Kessler |
| 3,995,897 A | 12/1976 | Paskert |
| 4,030,850 A | 6/1977 | Hyde |
| 4,072,328 A | 2/1978 | Elliott |
| 4,105,226 A | 8/1978 | Frey |
| 4,128,264 A | 12/1978 | Oldford |
| 4,191,384 A | 3/1980 | Svedberg |
| 4,276,010 A | 6/1981 | Shartzer |
| 4,471,978 A | 9/1984 | Kramer |
| 4,490,576 A | 12/1984 | Bolante |
| 4,508,369 A | 4/1985 | Mode |
| 4,600,223 A | 7/1986 | de Vries |
| 4,749,214 A | 6/1988 | Hoskins |
| 4,779,902 A | 10/1988 | Lee |
| 4,781,400 A | 11/1988 | Cunningham |
| 4,854,397 A | 8/1989 | Warren |
| 4,875,713 A | 10/1989 | Carstensen |
| 4,875,714 A | 10/1989 | Lee |
| 4,927,185 A | 5/1990 | McNaughton |
| 4,979,765 A | 12/1990 | Bartholomew |
| 5,005,877 A | 4/1991 | Hayman |
| 5,015,014 A | 5/1991 | Sweeney |
| 5,119,892 A | 6/1992 | Clegg |
| 5,219,188 A | 6/1993 | Abe |
| 5,251,942 A | 10/1993 | Whaley |
| 5,378,024 A | 1/1995 | Kumagai |
| 5,533,761 A | 7/1996 | Ostrander |
| 5,542,717 A | 8/1996 | Rea |
| 5,580,100 A | 12/1996 | Umezawa |
| 5,584,512 A | 12/1996 | Carstensen |
| 5,662,360 A | 9/1997 | Guzowski |
| 5,685,575 A | 11/1997 | Allread |
| 5,716,081 A | 2/1998 | Leigh-Monstevens |
| 5,738,388 A | 4/1998 | Sundelin |
| 5,826,921 A | 10/1998 | Woolley |
| 5,845,945 A | 12/1998 | Carstensen |
| 5,918,914 A | 7/1999 | Morris |
| 5,934,709 A | 8/1999 | Morrison |
| 5,971,445 A | 10/1999 | Norkey |
| 5,975,591 A | 11/1999 | Guest |
| 5,988,704 A | 11/1999 | Ryhman |
| 5,988,705 A | 11/1999 | Norkey |
| 6,062,326 A | 5/2000 | Strong |
| 6,152,496 A | 11/2000 | Kouda |
| 6,176,523 B1 | 1/2001 | Winslett |
| 6,325,424 B1 | 12/2001 | Metcalfe |
| 6,343,814 B1 | 2/2002 | Bucher |
| 6,401,820 B1 | 6/2002 | Kirk |
| 6,464,024 B2 | 10/2002 | Beaton |
| 6,499,771 B1 | 12/2002 | Snyder |
| 6,568,658 B2 | 5/2003 | Strome |
| 6,666,480 B2 | 12/2003 | Haney |
| 6,688,655 B1 | 2/2004 | Watanabe |
| 6,964,435 B2 | 11/2005 | Wolf |
| 6,988,747 B2 | 1/2006 | Allen |
| 7,029,035 B2 | 4/2006 | Seymour |
| 7,097,211 B2 | 8/2006 | Adams |
| 7,261,326 B2 | 8/2007 | Haney |
| 7,264,281 B2 | 9/2007 | Le Quere |
| 7,425,024 B2 | 9/2008 | Haney |
| 7,445,247 B2 | 11/2008 | Ericksen |
| 7,445,250 B2 | 11/2008 | Swift |
| 7,455,328 B2 | 11/2008 | Chelchowski |
| 7,469,933 B2 | 12/2008 | Swift |
| 7,470,383 B2 | 12/2008 | Haney |
| 7,523,966 B2 | 4/2009 | O'Neill |
| 7,810,850 B2 | 10/2010 | O'Neill |
| 7,832,774 B2 | 11/2010 | Densel |
| 7,841,630 B1 | 11/2010 | Auray |
| 7,963,570 B2 | 6/2011 | Swift |
| 2003/0094813 A1 | 5/2003 | Bucher |
| 2003/0116960 A1 | 6/2003 | Yates |
| 2003/0122372 A1 | 7/2003 | Muto |
| 2003/0155763 A1 | 8/2003 | Wolf et al. |
| 2004/0070198 A1 | 4/2004 | Rohrig |
| 2004/0245766 A1 | 12/2004 | Vallee |
| 2006/0214422 A1 | 9/2006 | Cuvo |
| 2007/0001450 A1 | 1/2007 | Swift |

FOREIGN PATENT DOCUMENTS

| | | |
|---|---|---|
| EP | 0 664 405 1 | 7/1995 |
| EP | 1 669 655 A1 | 6/2006 |
| EP | 1 703 191 A2 | 6/2006 |
| EP | 1 933 074 A2 | 6/2008 |
| FR | 2 810 087 A1 | 12/2001 |
| GB | 1 584 085 | 2/1981 |
| WO | 00/57096 | 9/2000 |
| WO | 2004/104365 | 12/2004 |

OTHER PUBLICATIONS

VMT Fibreglass Industries, "Glasspoll Fibreglass Reinforced Plastic Pipes and Screens" brochure, pp. 1-4, Jan. 1998, place of publication—unknown.

Eastern District of Pennsylvania, Order construing term "predetermined interior diameter" of U.S. Patent. No. 6,666,480, (Doc. No. 116), p. 1, Oct. 24, 2005, Civil Action No. 03-CV-2131, published on PACER (www.pacer.gov).

Eastern District of Pennsylvania, "Memorandum of Plaintiff Certainteed Corporation in Support of Motion for Summary Judgment of Invalidity of the Patent in Suit," (Doc. No. 92), pp. 4-7, 9-12, Sep. 19, 2005, Civil Action No. 03CV-2131, published on PACER (www.pacer.gov).

Marcel Decker, Inc., Thomas Sixsmith, "Handbook of Thermoplastic Piping System Design," pp. 137-141, 1997, ISBN No. 0-8247-9846-5.

CertainTeed Corporation, "Kwik-Set® Threaded Drop Pipe" brochure, p. 1, 2004, place of publication—unknown.

Eastern District of Pennsylvania, "Memorandum and Order" construing certain claim terms of U.S. Patent. No. 6,666,480, (Doc. No. 75), pp. 1-19, May 2, 2005, Civil Action No. 03-CV-2131, published on PACER (www.pacer. gov).

Transcript of Nov. 18, 2004 deposition of Northern Products witness Victor Weigel, pp. 40-41, 85-91, Civil Action No. A3-04-18 in the North Dakota District Court, Southeastern Division.

Transcript of May 12, 2004 deposition of Certainteed Corporation witness John Stott, pp. 120 and 209-214, Civil Action No. 03-CV-2131 in the United States District Court, Eastern District of Pennsylvania.

http://www.seatechinc.com/Technical/Product_Features, webpage printed Jan. 22, 2009.

Brochure of Sea Tech, Inc, for "10 Series Quick-Connect fittings and values" dated 2008.

European Patent Office; First Examination Report; Jan. 2, 2013; issued in European Patent Application No. 10 006 705.7.

Canadian Intellectual Property Office; Second Office Action; Jan. 15, 2013; issued in Canadian Patent Application No. 2,708,488.

European Patent Office, Examination Report dated Jun. 28, 2013 in European Application No. 10006705, pp. 1-6.

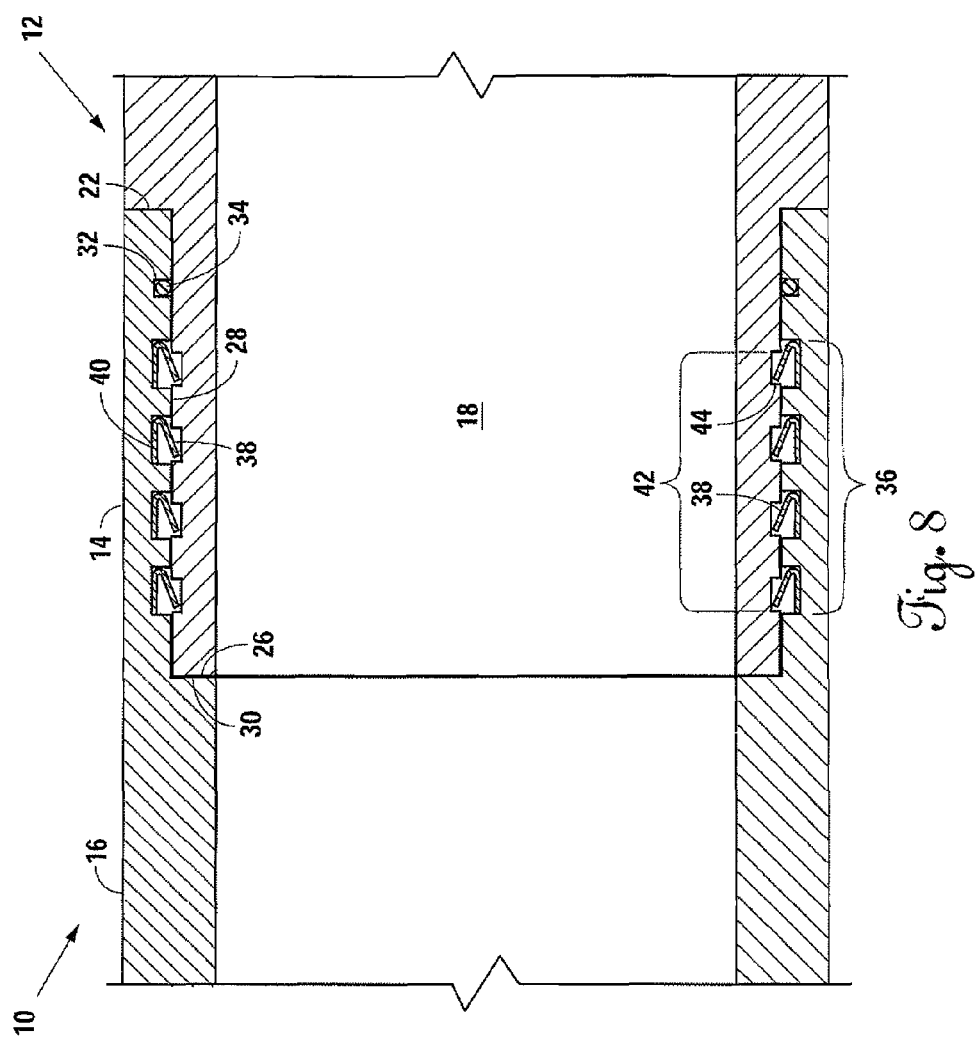

PUSH LOCK PIPE CONNECTION SYSTEM

CROSS REFERENCE TO RELATED APPLICATIONS

This application is a divisional of U.S. patent application Ser. No. 12/365,000 filed Feb. 3, 2009 entitled "Push Lock Pipe Connection System" which is incorporated herein by reference.

BACKGROUND OF THE INVENTION

1. Field of the Invention

The present invention relates generally to pipe connections and methods of securely connecting pipes, regardless of the material from which the connecting pipes are manufactured. More specifically, the preferred embodiment of the present invention relates to connection system that uses a plurality of rigid locking fingers extending from the interior surface of a female end of the pipe and corresponding locking grooves on the exterior surface of a male end of the pipe for receiving rigid locking fingers from a connecting length of pipe. The present invention offers a quick connection of two lengths of pipe without gluing, threading, or welding, as well as other advantages described herein. The connection system can be implemented into lengths of pipe through a manufacturing process so that the end product is an entire product line of pipe that employs the present connection system.

2. Description of the Related Art

In piping systems, there is a variety of ways to connect or join two separate lengths of pipe. In general, connections between two lengths of pipe traditionally have been achieved through one of four ways: (1) gluing or cementing; (2) welding; (3) threading; or (4) external connections such as collars and flanges. In gluing or cementing, an adhesive is applied to the male end, to the female end, or to both ends of the pipes being joined. The male end of one pipe is inserted into the female end of the adjacent pipe being joined and the adhesive cures, permanently joining the pipes. With welding, two metal pipes are joined using molten metal. In threading, the male end of a pipe has external threads and the female end of the adjacent pipe has internal threads. The male end is inserted into the female end of the adjacent pipe, the pipes are rotated, and the threads engage each other. With external connections such as collars and flanges, some sort of threaded fastener interacts with the external connecting structure to securely lock the connection between the two pipes.

Each of the aforementioned connection types has certain disadvantages. For example, a glued or cemented connection can be cumbersome and time consuming. The pipe surfaces must be cleaned and the adhesive applied and allowed to cure before the connection can withstand tensile force. Further, the pipes cannot be disconnected without ruining them. In threaded connections, which also can be achieved quickly, the pipes usually can be disconnected and reused, but the threaded connection cannot withstand high tensile forces. Welded connections can withstand significant tensile forces, but can only be used on metal pipes. Further, creating the weld is a time-consuming task, and, once the weld is formed it is difficult to remove and may not be possible without ruining the pipes. With external connections, the connection often can be removed and can withstand significant tensile forces, but forming the connection is also a time-consuming task.

It is therefore desirable to provide a type of pipe that allows a connection that will withstand large tensile forces and can be quickly formed with similar adjacent pipes. It is also desirable to provide a connection that can withstand large tensile forces yet be easily disconnected, with the proper tool. It is a further object of the present invention to provide a connection that can be achieved regardless of the material from which the pipe is made.

BRIEF SUMMARY OF THE INVENTION

The pipe of the present invention provides the advantage of a connection that can be quickly formed between pipes of the same or different materials. In addition, the connection formed between two similar, adjacent pipes may have a comparatively high tensile yield strength.

The pipe of the present invention has a female end for receiving a male end of a similar adjacent pipe. The interior surface of the female end has interior circumferential grooves and the exterior surface of the male end has corresponding exterior circumferential grooves. When the male end of the similar adjacent pipe is fully inserted into the female end, rigid fingers extending from the interior circumferential grooves are received within the exterior circumferential grooves and prevent the male end from be withdrawn.

The female end of the pipe has a female leading edge and an interior surface, which defines a male end receiving chamber within the female end. The male end receiving chamber will ultimately receive the male end of the similar adjacent pipe. The interior surface of the female end has at least one and preferably a plurality of interior circumferential grooves disposed on it. Rigid fingers extend from these interior circumferential grooves into the male end receiving chamber. Preferably, the rigid fingers extending from each interior circumferential groove are connected to a band seated within each of the interior circumferential grooves.

The male end of the pipe has a male leading edge, which leads the male end into the male end receiving chamber of the female end of a similar adjacent pipe. The male end has an outer circumference which is smaller in diameter than the diameter of the male end receiving chamber on the female end. Disposed on the exterior surface of the male end are at least one and preferably a plurality of exterior circumferential grooves. The number of exterior circumferential grooves will typically correspond to the number of interior circumferential grooves disposed on the interior surface of the female end of a similar adjacent pipe.

The exterior circumferential grooves on the male end are configured to receive the rigid fingers extending into the male end receiving chamber of the female end on a similar adjacent pipe. During the insertion of the male end into the male end receiving chamber, the rigid fingers are displaced toward the interior surface of the female end so that the male end can be fully inserted into the female end. When the male end is fully inserted into the male end receiving chamber the rigid fingers extending from the interior circumferential grooves on the female end are positioned within corresponding exterior circumferential grooves on the male end. The rigid fingers and their positioning within the corresponding exterior circumferential grooves prevent the male end from being withdrawn.

BRIEF DESCRIPTION OF THE DRAWINGS

FIG. 8 is a cross sectional side view showing alternative embodiments for the present invention taken along the female end of one pipe and the male end of a similar adjacent pipe, with the male end being fully inserted within the female end and the plurality of rigid fingers being positioned within their corresponding exterior circumferential grooves.

DETAILED DESCRIPTION OF THE INVENTION

Referring to FIGS. 1 through 4, the preferred embodiment of the present invention is shown with a pipe 10 and a similar adjacent pipe 12. In practice, the pipe 10 has the same structure as the similar adjacent pipe 12 and therefore, a description of structure that is present for the similar adjacent pipe 12 in the Figures applies equally to a description of the structure for the pipe 10, and vice versa.

Figure 1:
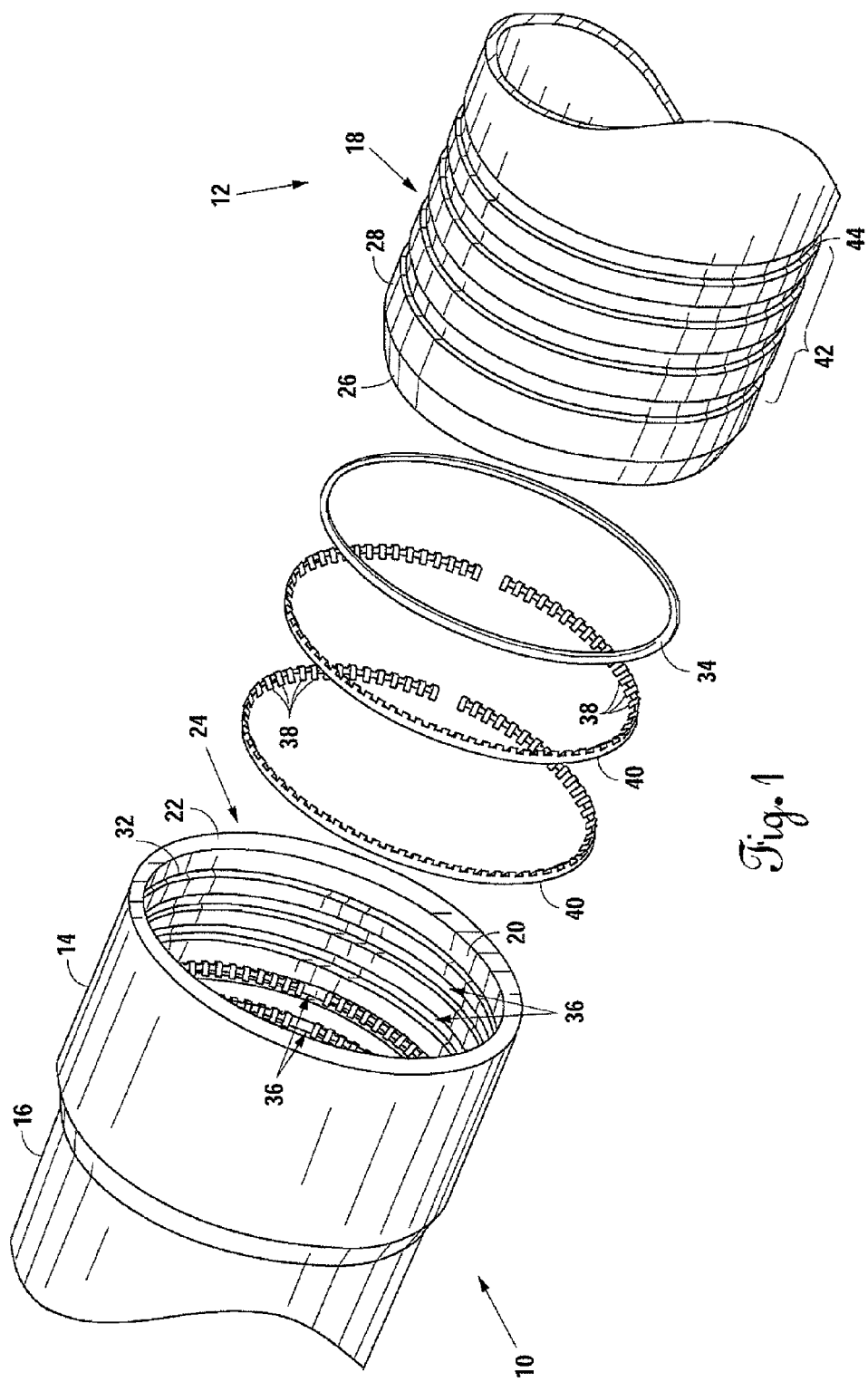
FIG. 1 is an exploded perspective view of the preferred embodiment of the present invention, as shown with the female end of one pipe and the male end of a similar adjacent pipe.
Figure 2:
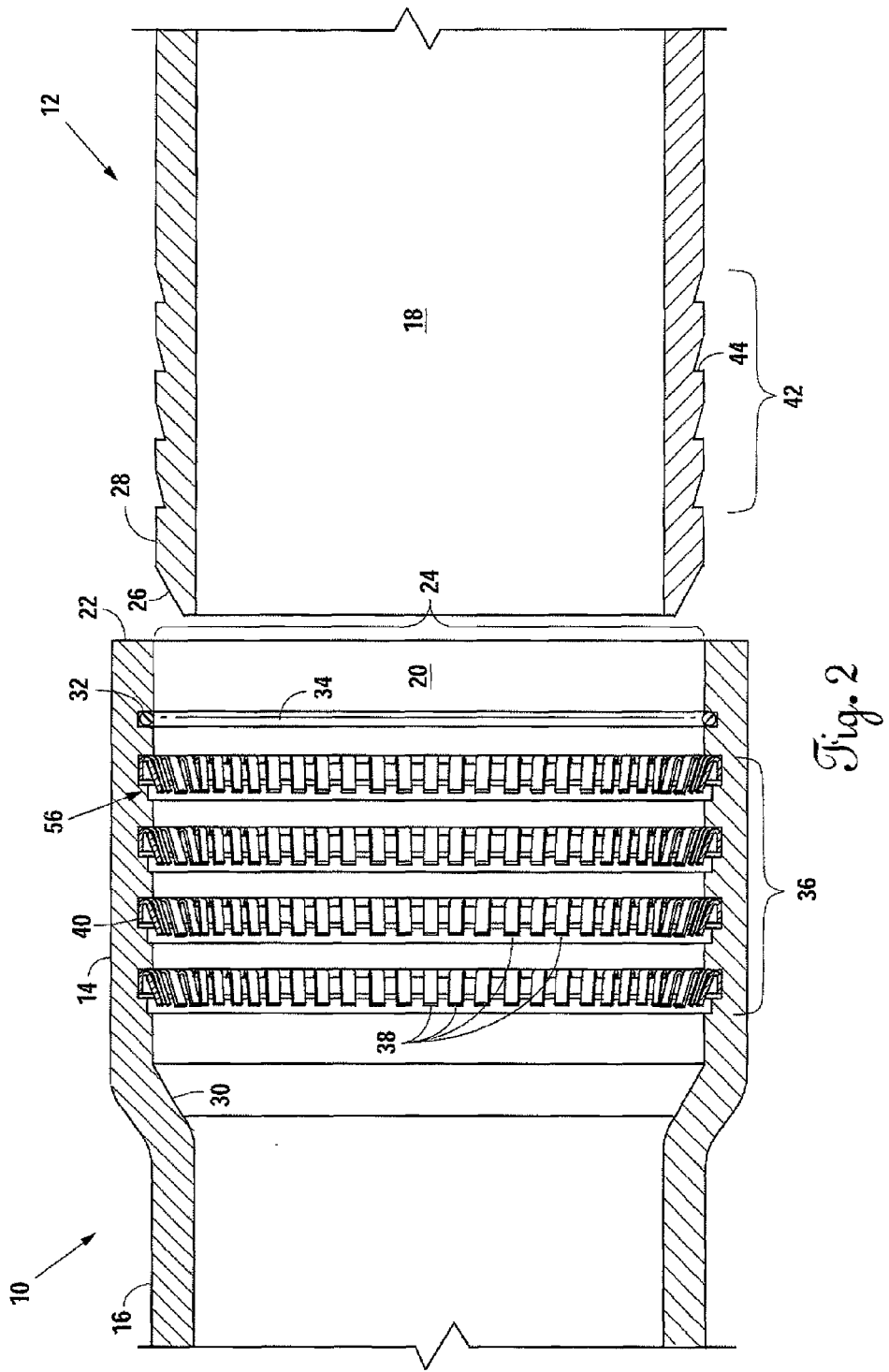
FIG. 2 is a cross sectional side view of the preferred embodiment for the present invention taken along the female end of one pipe and the male end of a similar adjacent pipe.

Pipe 10 has a female end 14, an intermediate length 16, and a male end 18. Referring to FIGS. 1 and 2, the female end 14 has an interior surface 20 and a female leading edge 22 that terminates the female end 14. Although not shown in FIGS. 1-4, it is anticipated that the female leading edge 22 could be beveled. The interior surface 20 of the female end 14 defines a male end receiving chamber 24, which is essentially the interior space within the female end 14. The male end 18 of the pipe 10 has a male leading edge 26 and an exterior surface 28 with a circumference that is smaller in diameter than diameter of the male end receiving chamber 24 on the female end 14. Preferably, the male end receiving chamber 24 will ultimately receive the male end 18 of the similar adjacent pipe 12 with minimal clearance when the pipes are connected. The pipe 10 is sized according to the outer diameter of its intermediate length 16 and has a tensile yield strength that is largely dependent on the material from which pipe 10 is made.

A stop member 30 is disposed within the pipe 10 preferably at the interior end of the male end receiving chamber 24. In the preferred embodiment, as shown in FIGS. 1-4, the diameter of the male end receiving chamber 24 is larger than the interior diameter of the intermediate length 16. As such, the stop member 30 in the preferred embodiment is a circumferential shoulder formed by the reduction in diameter from the male end receiving chamber 24 to the interior diameter of the intermediate length 16. Additionally, in the preferred embodiment, at least one circumferential sealing groove 32 with an O-ring 34 seated therein is disposed on the interior surface 20 of the female end 14. However, it is anticipated that in certain applications the circumferential sealing groove 32 and the O-ring 34 may not be present.

The interior surface 20 of the female end 14 has a plurality of interior circumferential grooves 36 disposed on it. In the preferred embodiment, the number of interior circumferential grooves 36 is four. However, it is anticipated that this number could be more or less and even as few as one, depending upon the application.

Figure 5:
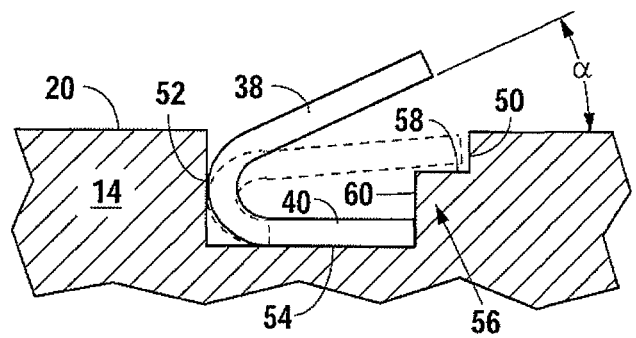
FIG. 5 is a cross sectional view showing the side profile of the preferred interior circumferential groove on the female and a finger from the plurality of fingers extending from a band seated within the groove.

A plurality of sets of rigid fingers 38 extend from each of the interior circumferential grooves 36 and into the male end receiving chamber 24, forming an acute angle α between each of the rigid fingers 38 and the interior surface 20 of the female end 14 and directed away from the female leading edge 22 (see FIG. 5). In the preferred embodiment, the angle α formed between each of the rigid fingers 38 and the interior surface 20 measures between 27° and 30° inclusive.

Although rigid, each of the rigid fingers 38 is displaceable and can be radially displaced toward and away from the interior surface 20 of the female end 14. Further, each of the rigid fingers 38 is biased toward a non-displaced position (as shown in FIG. 7C) in the male end receiving chamber 24 unless acted upon by some force. Preferably, the rigid fingers 38 are made of stainless steel. However, any number of substantially rigid materials could be used, depending on the application and the tensile forces involved. In the preferred embodiment, each set of rigid fingers 38 extends from a band 40 (see FIGS. 7A, 7B, & 7C) that is seated within each of the interior circumferential grooves 36.

As shown in FIG. 5, in the preferred embodiment, the interior circumferential grooves 36 have a generally rectangular cross section profile with a first side wall 50, a second sidewall 52, a bottom surface 54, and a shoulder 56 positioned adjacent the first side wall 50. The shoulder 56 has a top surface 58 and a side surface 60. In this embodiment, the band 40 is seated between the second sidewall 52 of the interior circumferential grooves 36 and the side surface 60 of the shoulder 56 such that the rigid fingers 38 extend above and over the shoulder 56. When the male end 18 is inserted into the female end 14, the minimal clearance there between will cause each set of rigid fingers 38 to be displaced at least partially, if not totally, into the interior circumferential grooves 36. In this regard, the distal end 48 of each of the rigid fingers 38 (see FIGS. 7A, 7B, & 7C) displaces into the space between the top surface 58 of the shoulder 56 and the top edge of the first sidewall 50 of the interior circumferential grooves 36

Disposed on the exterior surface 28 of the male end 18 is a plurality of exterior circumferential grooves 42 with each groove having a sidewall 44 at the side of the groove nearest the male leading edge 26. A bottom surface 46 extends from the bottom edge of the sidewall 44 and slopes at an angle to the exterior surface 28 of the male end 18, forming an acute angle with the exterior surface 28 (see FIG. 6). Preferably, the angle β formed between the bottom surface 46 of the exterior circumferential grooves 42 and the exterior surface 28 of the male end 18 is approximately 16°. As a result, in the preferred embodiment the exterior circumferential grooves 42 have a triangular cross section profile formed by the sidewall 44 and the bottom surface 46. Preferably, the number of exterior circumferential grooves 42 on the male end 18 will correspond with the number of interior circumferential grooves 36 on the interior surface 20 of the female end 14.

Figure 3:
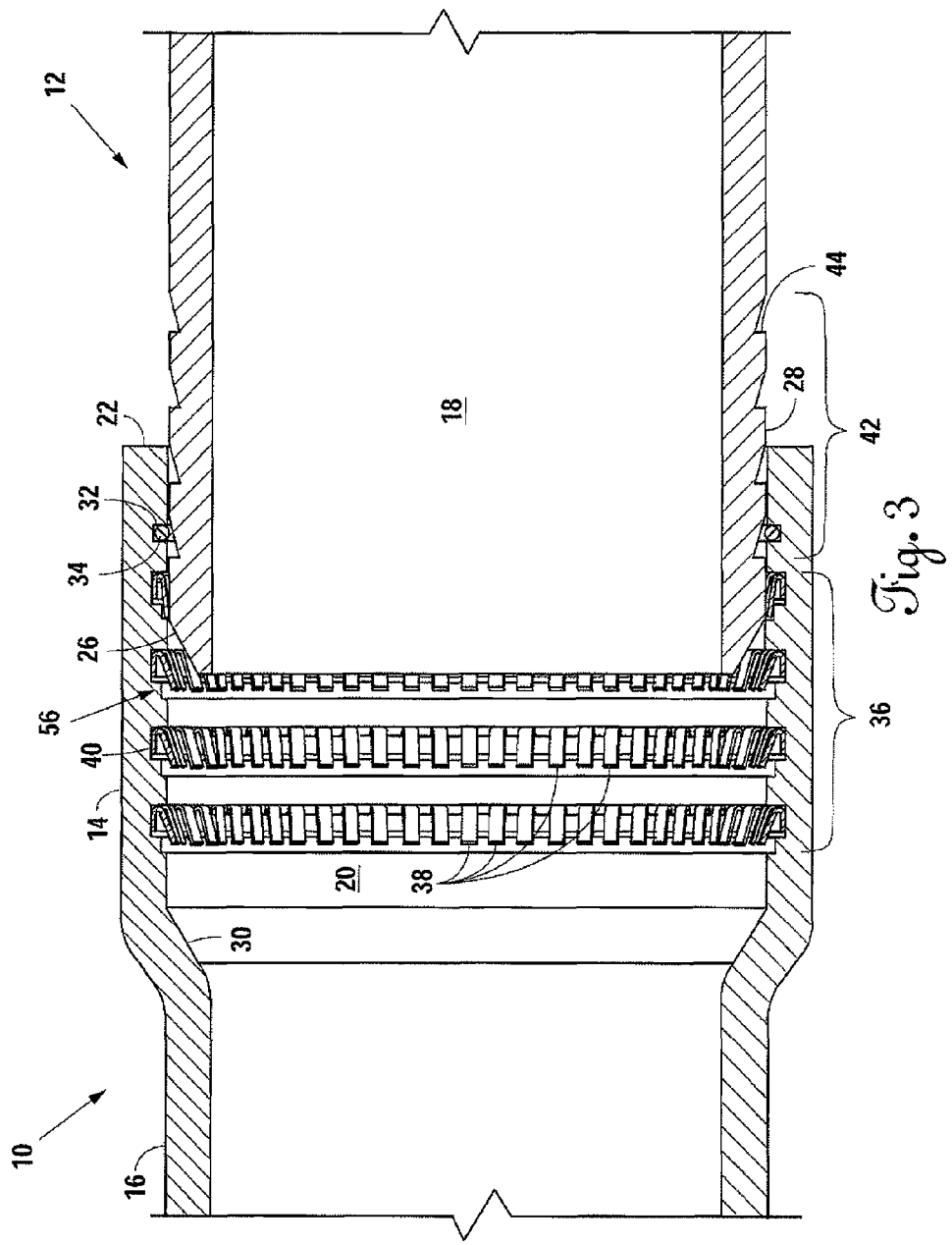
FIG. 3 a cross sectional side view of the preferred embodiment for the present invention taken along the female end of one pipe and the male end of a similar adjacent pipe, with the male end being partially inserted within the female end.

FIG. 3 shows the male end 18 of the similar adjacent pipe 12 partially inserted into the male end receiving chamber 24 of the female end 14 of the pipe 10. As shown, the male leading edge 26 of the male end 18 is beveled in the preferred embodiment of the pipe 10, with the bevel being set at an approximately 20° radially inward angle with respect to the exterior surface 28 of the male end 18. The angling of the rigid fingers 38 away from the female leading edge 22 allows the male end 18 to be inserted into the male end receiving chamber 24, and, the insertion is facilitated by the bevel at the male leading edge 26 as well as the triangular cross section profile of the exterior circumferential grooves 42. As the male end 18 is inserted, the exterior surface 28 of the male end 18 contacts the sets of rigid fingers 38 and causes the rigid fingers 38 to be displaced toward the interior surface 20 of the female end 14.

Figure 4:
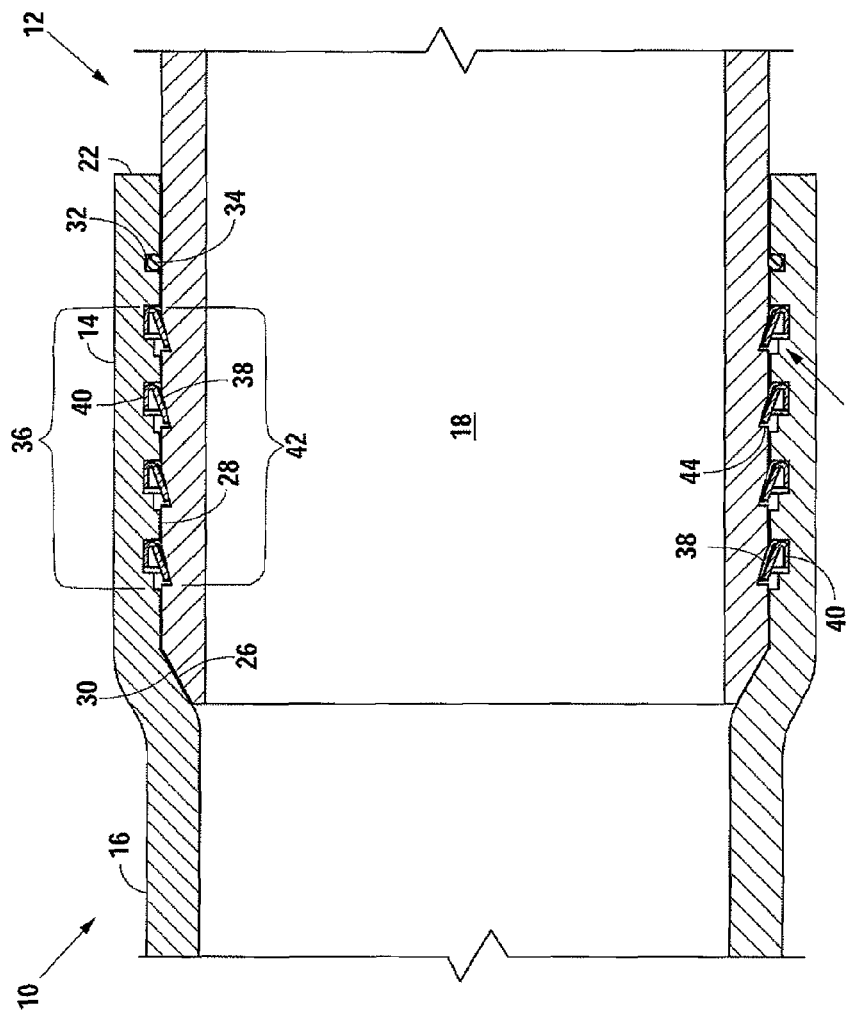
FIG. 4 is a cross sectional side view of the preferred embodiment for the present invention taken along the female end of one pipe and the male end of a similar adjacent pipe, with the male end being fully inserted within the male end receiving chamber and the plurality of rigid fingers being positioned within their corresponding exterior circumferential grooves.

FIG. 4 shows the male end 18 of the similar adjacent pipe 12 fully inserted into the male end receiving chamber 24 on the female end 14 of the pipe 10. When fully inserted, the male leading edge 26 abuts the stop member 30. With the male end 18 fully inserted into the female end 14 the sets of rigid fingers 38 are positioned over their corresponding exterior circumferential grooves 42 on the male end 18, allowing each set of rigid fingers 38 to spring back toward its non-displaced position such that the rigid fingers 38 are received within the corresponding exterior circumferential grooves 42 on the exterior surface 28 of the male end 18. Preferably, a set of the rigid fingers 38 becomes positioned within each exterior circumferential groove such that a distal end 48 (see FIGS. 7A, 7B, & 7C) of each of the rigid fingers 38 abuts the sidewall 44 of the exterior circumferential grooves 42. The abutment of the distal ends 48 of the rigid fingers 38 against the sidewall 44 prevents movement of the male end 18 of the similar adjacent pipe 12 out of the male end receiving chamber 24 of the female end 14 of the pipe 10, thereby locking the pipe 10 and the similar adjacent pipe 12 together.

Figures 7A, 7B:
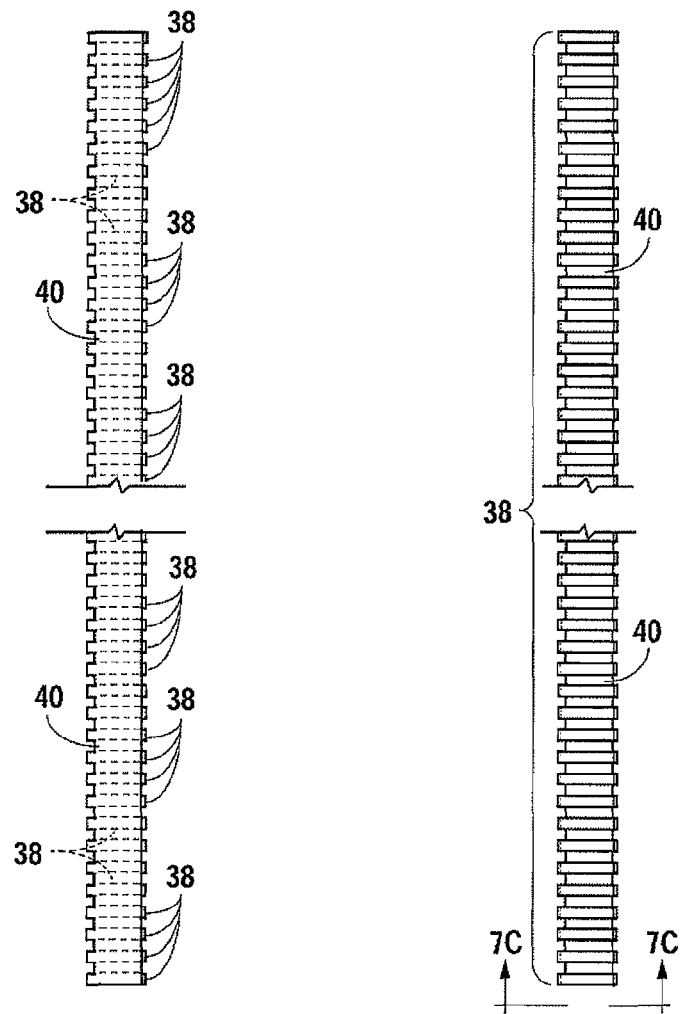
FIG. 7A is a back side view of a portion of a set of rigid fingers extending from the band that is present in the preferred embodiment.
FIG. 7B is a front side view of a portion of a set of rigid fingers extending from the band that is present in the preferred embodiment.
Figure 7C:
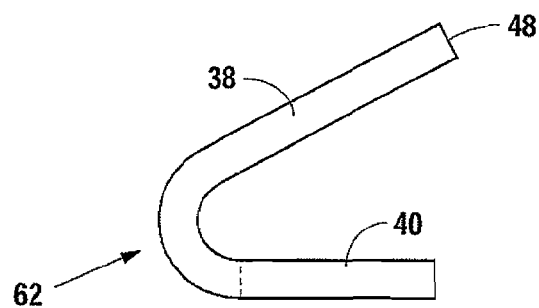
FIG. 7C is a side view taken along section line 7C-7C from FIG. 7B that effectively shows the preferred embodiment of a single finger from a set of rigid fingers, with the finger extending from the band that is present in the preferred embodiment.

FIGS. 7A & 7B show a portion of a set of rigid fingers 38 extending from the band 40. As noted, in the preferred embodiment the band 40 is seated between the second sidewall 50 of the interior circumferential grooves 36 and the side surface 60 of the shoulder 56.

FIG. 7C shows a side view of a set of rigid fingers 38 along section line 7C-7C in FIG. 7B and effectively illustrates the side profile of a single finger extending from the band 40. The finger extends from the band 40 through a bend 62. The bend 62 causes the rigid fingers 38 to extend out of the interior circumferential grooves 36 and into the male end receiving chamber 24 at the acute angle α away from the female leading edge 22, as shown in FIG. 5.

The number, shape, and size of rigid fingers 38 in each set of rigid fingers 38 is a design choice that depends on the application of the invention. With a 4.5 inch PVC pipe, the preferred embodiment of the present invention has 135 stainless steel fingers in each set, with one set per interior circumferential groove. Each of the rigid fingers 38 is 0.060 inches wide and the sets of rigid fingers 38 have a 0.060 inch gap between each finger. The band 40 is approximately 0.155 inches long from its bottom edge to the bend 62, and the rigid fingers 38 are approximately 0.209 inches long from the bend 62 to their distal ends 48.

Figure 6:
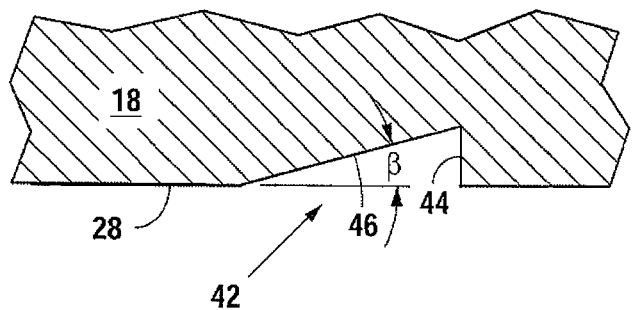
FIG. 6 is a cross sectional view showing the side profile of the preferred exterior circumferential groove on the male end.

As noted and shown in FIGS. 5 & 6, in the preferred embodiment the acute angle α created between the interior surface 20 of the female end 14 and the rigid fingers 38 is larger than the angle β between the bottom surface 46 of the exterior circumferential grooves 42 and the exterior surface 28 of the male end 18. As a result, the rigid fingers 38 bias against the bottom surface 46 of the exterior circumferential grooves 42 when fully received therein and will exert a continuous radially inward force on the bottom surface 39.

FIG. 8 shows an alternative embodiment having a different type of connection than the connection present in the preferred embodiment. The connection shown in FIG. 8 is referred to as a "Flush Mount" connection because the outer diameter of the female end 14 is substantially equal to the outer diameter of the intermediate length 16 between the male end 18 and the female end 14. In the Flush Mount connection, the male end receiving chamber 24 still has a diameter that is greater than the interior diameter of the intermediate length 16, but the male end receiving chamber 24 is formed by machining out the chamber and not by belling the female end 14 with a mandrel.

FIG. 8 also shows different embodiments of the invention that can be present regardless of whether a Flush Mount connection is used. For example, one aspect that differs from the preferred embodiment is the interior circumferential grooves 42 do not have a shoulder 56. Consequently, each band is wider and is seated between the sidewalls of each of the interior circumferential grooves 42. Another aspect that differs from the preferred embodiment is that the male leading edge 26 is not beveled in FIG. 8. Finally, FIG. 8 shows the alternative embodiment where the bottom surface 46 of the exterior circumferential grooves 42 is not angled and the exterior circumferential grooves 42 have a substantially rectangular cross section profile.

Although the present invention has been described with reference to specific embodiments, this description is not meant to be construed in a limiting sense. Various modifications of the disclosed embodiments, as well as alternative embodiments of the invention will become apparent to persons skilled in the art upon the reference to the above-description of the invention. It is, therefore, contemplated that the appended claims will cover such modifications that fall within the scope of the invention.

The invention claimed is:

1. A method of connecting a female end of a pipe to a male end of a similar adjacent pipe, the method comprising:
   seating a band in an interior circumferential groove on the interior surface of said female end of said pipe, wherein a plurality of rigid fingers extends from said band;
   extending said plurality of rigid fingers from said interior circumferential groove into a male end receiving chamber of said female end;
   receiving said male end of said similar adjacent pipe within said male end receiving chamber of said female end of said pipe;
   engaging said plurality of rigid fingers with said male end of said similar adjacent pipe;
   displacing said plurality of rigid fingers toward the interior surface of said female end of said pipe;
   positioning an exterior circumferential groove on said male end with respect to said plurality of rigid fingers; and
   receiving at least a portion of said plurality of rigid fingers into said exterior circumferential groove on said male end.

2. The method of connecting a female end of a pipe to a male end of a similar adjacent pipe as recited in claim 1 wherein preventing said male end of said similar adjacent pipe from being withdrawn from said female end of said pipe further comprises engaging distal ends of said plurality of rigid fingers against a sidewall of said exterior circumferential groove of said male end.

3. The method of connecting a female end of a pipe to a male end of a similar adjacent pipe as recited in claim 1, further comprising preventing the male end of said similar adjacent pipe from inserting farther into said pipe.

4. The method of connecting a female end of a pipe to a male end of a similar adjacent pipe as recited in claim 3 wherein preventing said male end of said similar adjacent pipe from inserting further into said pipe further comprises engaging said male end of said similar adjacent pipe with a stop member positioned on the interior surface of said female end of said pipe.

5. The method of connecting a female end of a pipe to a male end of a similar adjacent pipe as recited in claim 1, further comprising preventing said male end of said similar adjacent pipe from being withdrawn from said female end of said pipe.

6. The method of connecting a female end of a pipe to a male end of a similar adjacent pipe as recited in claim 1, wherein said interior circumferential groove on said interior surface of said female end of said pipe is formed with a bottom surface, a first side wall, a second sidewall opposite said first sidewall, and a shoulder having a top surface that meets said first side wall and a third side surface that meets said top surface and said bottom surface, wherein each finger of said plurality of rigid fingers includes a free distal end extending outside of said interior circumferential groove when said rigid fingers are in a non-displaced position, and wherein displacing said plurality of rigid fingers toward said interior surface of said female end of said pipe further comprises displacing said free distal end into an area of said interior circumferential groove defined by said top surface of said shoulder and said first side wall.

\* \* \* \* \*